A. G. Shaver,
Eraser.
No. 1660. Reissued April 26 1864.
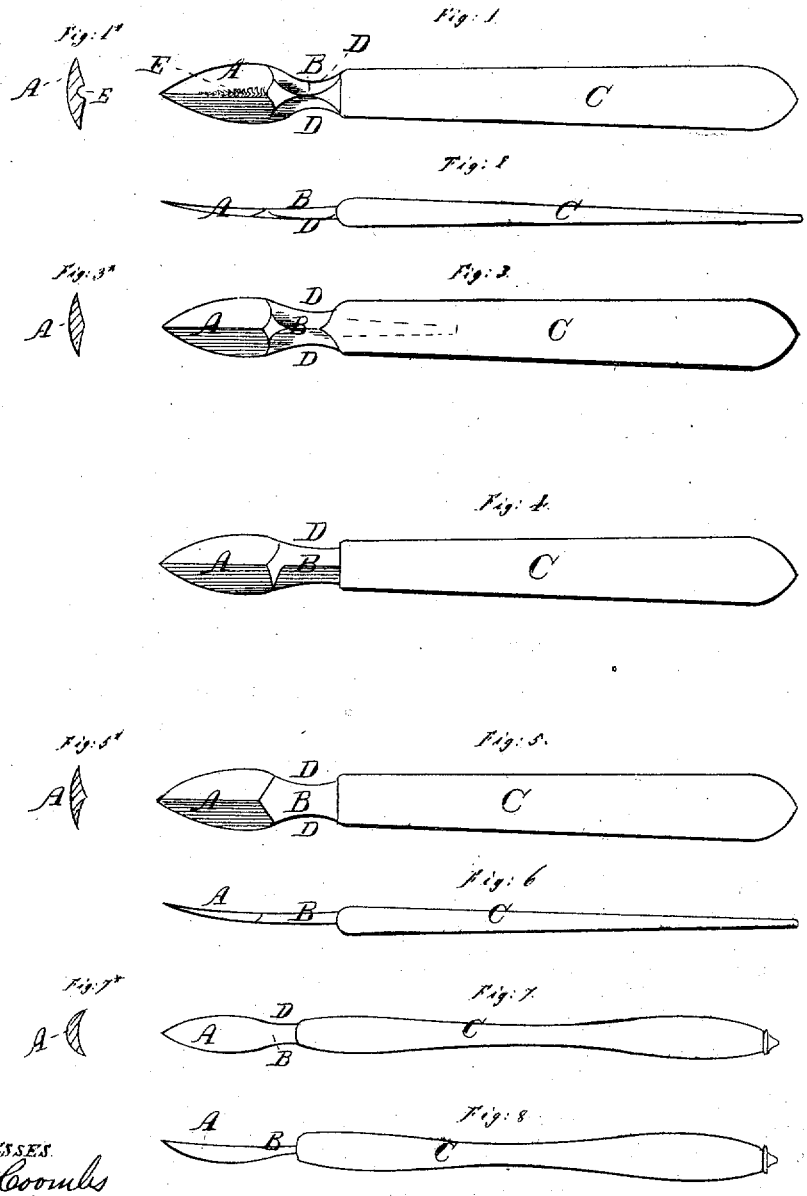
WITNESSES.
J. W. Coombs
G. W. Reed
INVENTOR.
A. G. Shaver
per Munn & Co
attys

UNITED STATES PATENT OFFICE.

ARCHIBALD G. SHAVER, OF NEW HAVEN, CONNECTICUT.

ERASER AND PENCIL-SHARPENER.

Specification forming part of Letters Patent No. 22,196, dated March 8, 1859; Reissue No. 805, dated August 30, 1859; Reissue No. 1,660, dated April 26, 1864.

*To all whom it may concern:*

Be it known that I, ARCHIBALD G. SHAVER, of the city and county of New Haven, and State of Connecticut, have invented a new and useful Improvement in the Construction of Erasers; and I do hereby declare that the following is a full, clear, and exact description of the same, reference being had to the accompanying drawings, forming part of this specification, in which—

Figures 1, 3, 4, 5, and 7 are plans or top views of different forms of my eraser. Figs. 2, 6, 8 are side elevations of the same. Figs. 1*, 3*, 5*, 7* are transverse sections of the same.

Similar letters of reference indicate corresponding parts in all the figures.

This invention consists in giving to one side of the eraser a convex form in such a manner that the same can be conveniently used as a burnisher or polisher.

It consists further in combining with this curved or convex eraser a pencil-sharpener, by forming a cutting-edge on one or both sides of the shank thereof; and it consists, finally, in the application to the surface of the blade or shank of the eraser of a serrated or roughened groove, for the purpose of finishing the point of the pencil or sharpening it after the wood has been cut away.

The blade A of my eraser is formed of steel, and should be of the best quality. It is made thin toward its edges, in the shape of a heart or approaching thereto, and provided with a shank, B, and handle C, which may be of wood or other material and of any pattern convenient for the purpose. The shank B is provided with curved indentations D, one or both of which are brought down to a cutting-edge to serve as a pencil-sharpener, and on the surface of the shank or some other convenient part of the blade I indent a groove, E, which should be acutely triangular n ts cross-section and roughened like a file on its two surfaces to properly finish the point of the pencil by rubbing the lead along said groove and revolving the pencil at the same time.

The blade A, instead of being flat and having its edge situated in a plane, has its under surface curved up toward the point and edges, as clearly shown in Figs. 2, 6, and 8 and the sectional Figs. 1*, 3*, 5*, 7*, and the convexity thus formed constitutes the most important feature of my invention. The curved or convex surface may be straight on its cross-section, except near its edges, which in that case must be bevele l or chamfered off to raise the cutting and scraping edges above the surface of the paper and adapt the eraser to be used as a polisher or burnisher; or the whole surface must be convex in cross section as well as in longitudinal section, whereby the cutting-edges would also be elevated from the surfaces to be polished.

This eraser, when made thin, may be used as a paper cutter and folder as well as for the purposes above named. Its whole surface, except the groove E, should be highly finished and polished, like fine cutlery or other similar articles. It must be remarked, however, that the exact form or shape in the drawings is not an essential one as long as the convex surface is maintained.

What I claim as new, and desire to secure by Letters Patent, is—

1. An eraser with a convex or burnishing back, substantially as and for the purpose set forth.

2. The application of one or more cutting-edges, D, to the shank of an eraser.

3. The serrated or file groove E, for the purpose herein shown and described.

ARCHIBALD G. SHAVER.

Witnesses:
J. A. WOOD,
WM. W. WHITE.